(12) United States Patent
Simpson et al.

(10) Patent No.: US 6,466,205 B2
(45) Date of Patent: *Oct. 15, 2002

(54) SYSTEM AND METHOD FOR CREATING 3D MODELS FROM 2D SEQUENTIAL IMAGE DATA

(75) Inventors: Todd Simpson; Edward C. Vanwieren; David Alan Spooner; Leonard Thomas Bruton, all of Calgary (CA)

(73) Assignee: Push Entertainment, Inc., Calgary (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,889

(22) Filed: Nov. 19, 1998

(65) Prior Publication Data

US 2001/0052899 A1 Dec. 20, 2001

(51) Int. Cl.$^7$ .............................................. G06T 15/00
(52) U.S. Cl. ...................... 345/419; 345/584; 345/629; 345/473
(58) Field of Search ................................ 345/419, 420, 345/425, 426, 429, 473, 474, 475, 433, 434, 435, 427, 428, 581, 584, 619, 620, 629, 479

(56) References Cited

U.S. PATENT DOCUMENTS

| | | | | |
|---|---|---|---|---|
| 4,925,294 A | | 5/1990 | Geshwind et al. ............ 352/57 |
| 5,103,305 A | * | 4/1992 | Watanabe .................... 358/105 |
| 5,511,153 A | * | 4/1996 | Azarbayejani et al. ...... 395/119 |
| 5,598,515 A | * | 1/1997 | Shashua ..................... 395/112 |
| 5,633,995 A | * | 5/1997 | McClain ..................... 395/119 |
| 5,635,982 A | * | 6/1997 | Zhang et al. ............... 348/231 |
| 5,706,417 A | * | 1/1998 | Adelson ...................... 395/129 |
| 5,768,415 A | * | 6/1998 | Jagadish et al. ............ 382/154 |
| 5,805,733 A | | 9/1998 | Wang et al. ................ 382/232 |
| 5,818,959 A | * | 10/1998 | Webb et al. ................ 382/154 |
| 5,821,943 A | * | 10/1998 | Shashua ..................... 345/427 |
| 5,892,521 A | * | 4/1999 | Blossom et al. ............ 345/501 |
| 6,052,492 A | * | 4/2000 | Bruckhaus .................. 382/284 |

OTHER PUBLICATIONS

International Search Report PCT/US99/27607.

* cited by examiner

Primary Examiner—Mark Zimmerman
Assistant Examiner—Enrique L. Santiago
(74) Attorney, Agent, or Firm—Fulbright & Jaworski L.L.P.

(57) ABSTRACT

A system and method providing for the generation of an image having enhanced three-dimensional attributes from a source image having only two-dimensional spatial domain information is disclosed. Object image discrimination through the use of machine vision techniques is utilized to identify objects within the source image. Thereafter, object images are dissected into image cells wherein the object images are supplemented to include missing information. Generation techniques are utilized to reassemble the image cells into an image having the desired enhanced three-dimensional attributes.

20 Claims, 4 Drawing Sheets

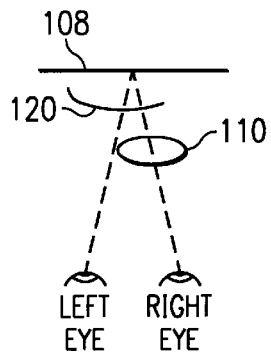
FIG. 6A
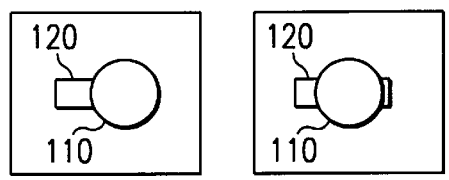
FIG. 6B
FIG. 7
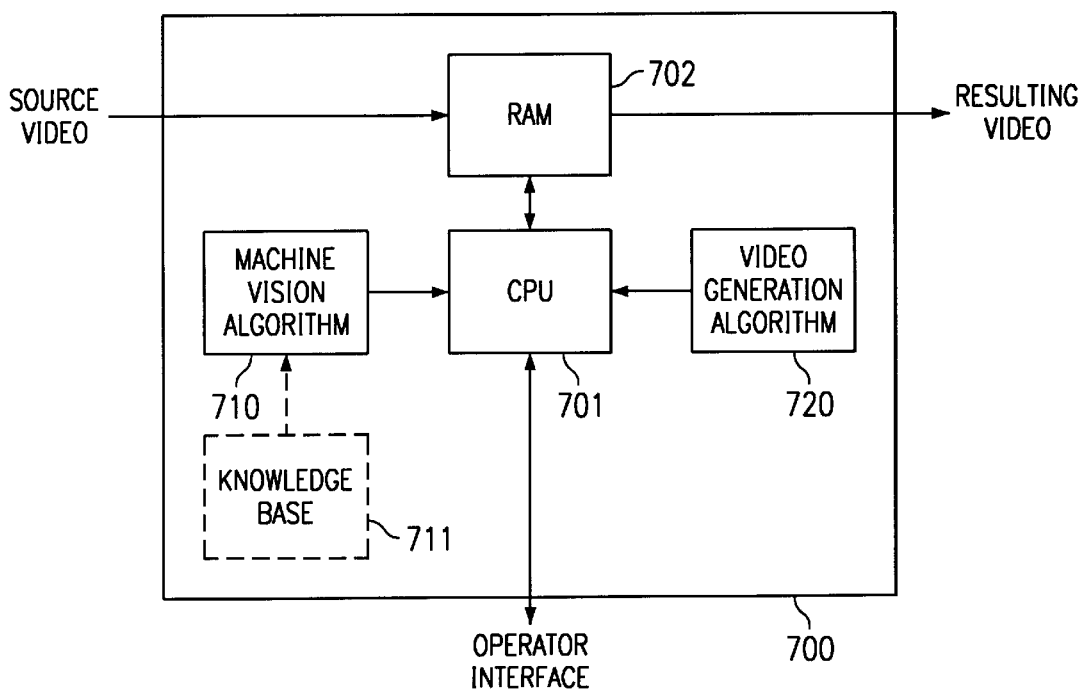

SYSTEM AND METHOD FOR CREATING 3D MODELS FROM 2D SEQUENTIAL IMAGE DATA

TECHNICAL FIELD OF THE INVENTION

The present invention relates generally to digital manipulation of image signals and more specifically to a system and method for creating 3D models from 2D digital input images.

BACKGROUND OF THE INVENTION

The depiction of visual images as spatial domain representations displayed by a system on a suitable display device, such as the cathode ray tube ("CRT") of a television or computer monitor or via film projected on a screen, is well known in the art. However, as such display devices are typically limited to presenting the representations as a two-dimensional spacial representation on the surface of the display device, these spatial domain representations do not include complete visual image information. For example, due to occlusion by a foreground object, image information with respect to a background object may be missing. Likewise, image depth, or parallax, information, discernable as an apparent displacement in the position of an object as seen against a more distant background or other object when the viewpoint is changed, is typically lost in two-dimensional representations.

However, acquisition of such visual images to be represented two-dimensionally is straight forward, using opto-electronic transducing devices such as movie film cameras, video cameras and computer scanning devices to capture a spatial domain representation from a single vantage point, where the source of the visual image is a perceptible image. Likewise, acquisition of two-dimensional images generated on a digital system using a variety of computer software programs, such as word processing, drawing and animation programs, where the source of the visual image is imperceptible is also straight forward. Therefore, there is a wealth of video images and film images captured and stored as two-dimensional representations as well as infrastructure, including systems and equipment, for such two-dimensional image acquisition.

Regardless of their source, these acquired images may be represented and stored in digital systems as arrays of digital numbers. A digitized image is simply a set of numbers having a direct correspondence with the pixels of the displayed image. For example, a displayed image might consist of 512 by 640 pixels where each pixel is characterized by a range of possible luminous intensities and colors. Film images can also be processed into a matrix of pixels similar to video images.

Processing of digital video images is well known in the art. Traditionally, such prior art digital video processing has been divisible into two major categories. The first prior art category results in a new video image being produced such as through the use of chroma-keying, image compositing and overlaying, rendering, transitions including wipes and fades, and computer generated images including three dimensional computer models and titles. These techniques and their like may be generally categorized as "video generation" techniques, and result in a new two-dimensional spatial domain representation of a video image.

Contrariwise the second prior art category processes a video image not to generate a new video image, but rather to discern information therefrom, such as in an effort to recognize objects from within the image. Such processing is often used in robotics, for example, in order for feedback to be provided with respect to the operation of a manipulator. Video processing to differentiate between objects appearing in the image or to otherwise discern information contained within the image may be generally categorized as "machine vision" techniques.

It shall be appreciated that application of neither of the above mentioned techniques produces a resulting image having information beyond that available within the supplied images. As described above, the generation technique simply results in a new spatial domain data set from compositing or manipulating input images. Likewise, the machine vision technique simply produces a data set indicative of the position, movement, etc. of an object appearing in an input image.

Additionally, the above mentioned techniques have been isolated in their application. For example, image generation techniques typically generate a resulting image by mechanically applying a desired generation technique to a selected image or data set. Accordingly, chroma-key video generation simply removes an area of an input image having a particular color associated therewith and replaces this area with a second input image. Likewise, computer generated models and titles merely superimpose the computer generated image over an input signal or over a blank screen. As utilized in the prior art, such mechanical applications of image generation techniques would benefit little from the application of machine vision techniques.

Similarly, machine vision techniques are typically applied in order to generate data with respect to a object within an image. As such, the applications utilizing machine vision techniques are generally disinterested in the manipulation of an output image. Therefore, applications of machine vision techniques used in the prior art would not benefit from the application of image generation techniques.

However, it may desired to manipulate an image to produce image information beyond the two-dimensional spatial domain information available by the above described techniques. For example, in stereoscopy, where the sensation of depth obtainable with binocular vision due to small differences in parallax producing slightly differing images to each eye of a viewer, an image more complex than the simple two-dimensional representation is necessary. However, the above mentioned isolated digital processing techniques are each insufficient to extract information from a digital video image in order to properly manipulate the image to produce a resulting stereoscopic image.

One example of a prior art system is shown in International Application No. PCT/AU96/00820 filed Dec. 20, 1996, which illustrates how to create 3D images from 2D input by elongating and/or moving the existing images. This system does not allow for objects to be "released" from their background and, when viewed, appear to stick out from the screen.

Therefore, there is a need in the art for a system and method for processing images in order to extract information beyond that directly ascertainable from an image representation.

There is a further need in the art for applying information extracted from image representations to manipulate the image in order to produce a resulting image representation including information beyond that directly available from a source.

There is a still further need in the art to utilize information extracted from a two-dimensional spatial domain representation of an image in order to generate an enhanced image providing robust images such as a stereoscopic three-dimensional representation of the input image.

SUMMARY OF THE INVENTION

These and other objects, features and technical advantages are achieved by a system and method which utilizes information with respect to objects within a sequential input image, such as is available from the aforementioned machine vision technique, in order to extract, extrapolate and/or interpolate information about the image not directly presented by a two-dimensional spatial domain representation. This information is then utilized with available image manipulation techniques to produce a resulting image having robust attributes not available through the use of image manipulation techniques alone.

In a preferred embodiment of the present invention, source images, such as the aforementioned two-dimensional spatial domain representations, acquired using standard film or video capturing techniques are converted into enhanced images having the illusion of three dimensions. In an alternative embodiment, the resulting video images are in the form of stereoscopic three-dimensional images. Accordingly, the present invention, utilizing machine vision techniques, operates to dissect the source image into object components. Through this process, the present invention is operable to extract or extrapolate information with respect to objects, and their interrelationship, as contained within the image.

Source images may be provided from any number of sources and may include a single image or a series of related images. For example, a series of slightly different images which may be displayed in rapid temporal sequence in order to create the perception of smooth motion as, in the case of television or film image sequences, may be used. Utilizing the aforementioned machine vision techniques, the present invention operates to interpolate spatial domain information with respect to the objects through reference to temporal domain information. For example, where an object in the foreground of the spatial domain representation moves with respect to other objects throughout the temporal domain, spatial domain information for any particular image may be interpolated from information available in other images in the sequence. The interpolated information is used to fill in the information "missing" when each object of the visual image is separated away from the whole.

Thereafter, the present invention operates to produce a new image utilizing the above acquired information. Production of this new image may utilize image manipulation techniques, such as rendering, computer modeling, compositing and overlaying, in order to recombine the objects of the source image into a resulting image incorporating the above acquired information.

For example, the present invention may utilize the acquired information to determine that an image object is in the foreground while another object is in the background. From this information, and utilizing the image generation techniques of rendering and overlaying, the present invention may operate to produce a new image including object shadowing from a heretofore nonexistent light source.

Likewise, the present invention may utilize this information in combination with the image generation technique of overlaying to produce two new images wherein the objects of each image are overlaid with slight variations. By presenting one image to each of a viewer's two eyes, the sensation of depth is obtained due to small differences in parallax.

It shall therefore be appreciated that a technical advantage of the present invention is its ability to extract information beyond that directly ascertainable from a source image.

A further technical advantage is realized in that the information extracted from the source image may be utilized to manipulate the image in order to produce a resulting image representation including information beyond that directly available from the source image.

A still further technical advantage of the present invention is its ability to produce a stereoscopic three-dimensional image from a source image having only a two-dimensional spatial domain representation. As such, the present invention is uniquely able to generate stereoscopic three-dimensional images from a wealth of pre-existing images.

Likewise, an additional technical advantage is realized in that the present invention is uniquely suitable for producing enhanced images, such as the aforementioned stereoscopic images utilizing common, and typically inexpensive, image capturing equipment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 6A illustrates an overhead view of the viewing of the physical objects represented in a frame of FIG. 1;

FIG. 6B illustrates a set of stereoscopic images representing the object placement of FIG. 6A resulting from a preferred embodiment of the present invention;

FIG. 7 illustrates a block diagram of a preferred embodiment of the present invention.

DESCRIPTION OF THE PREFERRED EMBODIMENTS

Figure 1:
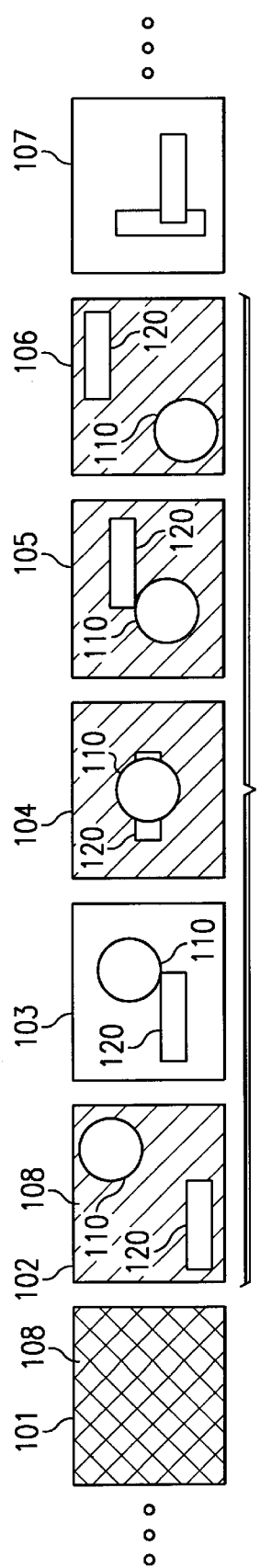
FIG. 1 illustrates a series of video (or film) image frames.

Directing attention to FIG. 1, a set of captured video (or film) images is depicted as frames 101–107. The images represented in these frames may be acquired by any number of methods. For example, opto-electronic transducing devices, such as video cameras and computer scanning devices, may have been used. Likewise, the images might have been originally generated on a digital system, such as a general purpose processor-based system or personal computer (PC). Moreover, the images may have been produced utilizing a combination of the above methods, or the images could have been hand drawn or abstracted from film images. The word video herein includes all of the above.

The frames of FIG. 1 may be representative of a sequence of images in the temporal domain. Here, for example, frames 102–106 include a continuity of objects in a series of slightly different images which, when displayed in rapid temporal sequence, produce a "scene" where the objects appear to move smoothly.

Video images, such as those depicted in frames 101–107, may be digitized wherein digital information, (a set of numbers having a direct correspondence to image information in the spatial domain), is utilized to store, manipulate, and/or reproduce the images. For example, a displayed image such as that of frame 101 might consist of 512 by 640 pixels where each pixel is characterized by a range of possible luminous intensities and colors. Each of these pixel characterizations includes information representing the image at a particular point in the spatial domain.

Accordingly, images of frames 101–107 may be digitized such that the spatial domain information is retained for processing, manipulation, storage, and/or presentation by a digital processing system. For example, a general purpose processor-based system, such as a PC, may accept such a digitized representation in order to process the image according to the desires of a user. Digital processing may include object identification such as through the use of the aforementioned machine vision techniques. Similarly, the PC may process the digitized representation in order to manipulate and display the image such as through the use of the aforementioned video generation techniques.

However, according to a preferred embodiment of the present invention, digital image processing includes video processing techniques utilized in a new and novel way so as to extract, extrapolate, and/or interpolate new and useful information from a source image. Thereafter, a video image is generated incorporating the new information which includes more than the simple spatial domain data available from the source image.

Accordingly, a preferred embodiment of the present invention utilizes a general purpose processor-based system, such as PC 700 illustrated in FIG. 7, adapted to manipulate video image information through the use of machine vision algorithm 710 and video generation algorithm 720. PC 700 includes processor (CPU) 701 coupled to memory (RAM) 702. RAM 702 provides storage for digitized image information associated with a source video image as well as for any video image resulting from the operation of the present invention. PC 700 is also adapted to accept input of a source video as well as output a resulting video. Of course, acceptance and output of such video may be in digitized form. Alternatively, PC 700 may be adapted to accept and/or output analogue video, such as in the form of National Television System Committee (NTSC) compatible signals. It should be noted that while a processor is shown, the system could be hard wires, or could be a series of processors.

PC 700 also includes an operator interface providing information exchange with an operator of the system. Such information exchange may include the display of source and/or resulting video images on a suitable display device. Additionally, the information exchange may include an operator selecting and/or inputting information with respect to the generation of video images according to the present invention.

When an image sequence is segmented over time, portions of the desired segment may not be defined when they are occluded by other segments. For example, the rectangle segment 120 in FIG. 1 is not defined when circle 110 has occluded it as shown in FIG. 1, Segment 104 and FIG. 2, Segment 204c. Fundamental to this invention is the ability to fill in this missing data in a realistic manner.

Figure 8:
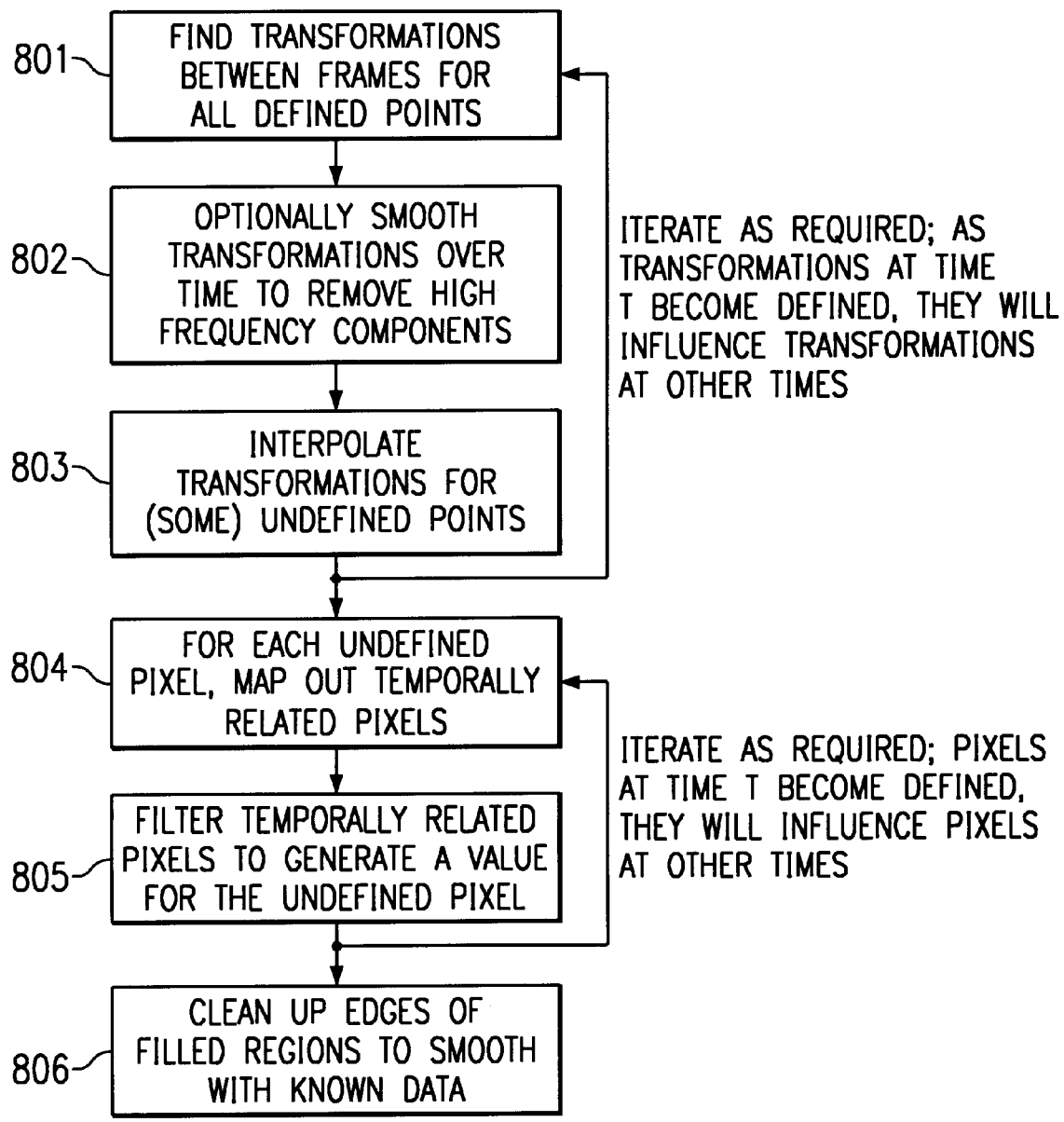
FIG. 8 shows the steps involved in occlusion filling.

For the sake of presentation, we will start with some simple cases and build up to the general case, as outlined in FIG. 8.

Background 108 in FIG. 1 represents the easiest case. As to view circle 110 and rectangle 120 move across background 108, different areas of the background are exposed. As the background does not move, the values for undefined pixels in the first frame can be found by looking in the same pixel locations in subsequent frames. This is a direct temporal lookup. Note that this lookup can be forward or backward in time.

Rectangle 120 in FIG. 1 presents a harder case. As the rectangle is moving, we cannot look for a value for the rectangle in the same location at other times—the rectangle was not there. For the rectangle, we must determine its motion and then compensate for this motion in the temporal lookup. For each pair of subsequent frames, we analyze the motion of the data. This can be done by regions (such as MPEG motion estimation), or by pixel, or by many other methods. This motion should be analyzed on the segmented image; otherwise, the movement of other objects may interfere. For example, if we attempted to analyze the motion of the rectangle with the circle still in the frame, we may be thrown off. However, we cannot directly analyze the motion of the rectangle when it is not defined. Thus, we interpolate the motion of defined areas in order to fully define the motion of the rectangle. This corresponds to steps 801 and 803 of FIG. 8. Optionally, the resultant motion vectors may be temporally smoothed in order to define a uniform motion as shown in step 802.

Once the motion of the rectangle has been determined, we can temporally lookup the missing values by searching forward and backward in time along the motion vectors (step 804). Once the related pixels are found, they can be filtered to generate a value for the undefined pixel (step 805). This process is iterated until all undefined pixels are filled. Thereafter, some spatial edge cleanup may be employed (as shown in step 806).

In this example, motion is a transformation between frames or portions of frames.

In the most general case, transformations can be determined which go beyond motion; rotation, translation, scaling, and deformation can all be analyzed. In these cases, the lookup of temporally related information becomes more complicated. For example, if scaling transformations are found, the current pixel may be related to either a portion of a pixel in other frames, or a group of pixels in other frames. In either case, all of the temporally related pixels can be used to determine the current value. Consider an object coming towards the screen. This object would have a scaling transformation—it gets bigger with time. An undefined pixel at a time t may be temporally related to 8 pixels at time t+5. The 8 pixels could then be filtered spatially (i.e., averaged), and combined with other temporally related data from other frames in order to create a value at time t.

Of course, there will be times when no temporal information is available—such as when an object is stationary. In these cases, information in key frames is generated using other methods (i.e., manually or using spatial mapping and filtering). Once a key frame is done, this information will be available to other frames temporally.

Although a preferred embodiment of the present invention utilizes a general purpose processor-based system, it shall be appreciated that any combination of special purpose devices and/or general purpose devices adapted to operate according to the present invention many be utilized. For example, a general purpose processor-based system may be adapted to accomplish particular aspects of the present invention while a special purpose video image generation device coupled thereto accomplishes other aspects.

The machine vision techniques provided by machine vision algorithm 710 are operable to differentiate between the objects appearing in a particular source image. For example, using these techniques the present invention is able differentiate circle 110 and rectangle 120 of frames 102–106, from each other, a background, etc.

The particular method used to distinguish between the objects of an image may be any of a number of such methods. In the simplest form, an operator through the use of the operator interface may demarcate particular objects of interest such as through identifying a subset of spatial domain information identified with particular objects. Alternatively, the processor system may distinguish objects within an image through use of a knowledge based system such as optional knowledge base 711. Likewise, the processor system may reference a series of frames in order to distinguish particular objects through coalescence of spatial domain data throughout the series of frames. The latter two methods have the advantage of requiring little or no operator input in order to distinguish between the objects.

From the objects distinguished within the image, particular objects to which, or for which, image modification is to be made may be selected. For example an operator may identify particular object images to be manipulated by the present invention. Likewise, the present invention may make such a determination based on information such as the relative movement of an object from frame to frame. Of course, all of the objects may be utilized for image modification, if desired.

Thereafter, according to a preferred embodiment of the present invention, machine vision algorithm 710 tracks the selected objects throughout frames of a scene, such as the sequence of frames 102–106. As such, the processor system is utilized to distinguish each of the selected objects throughout the series of frames.

Of course, knowledge based systems or image interpolation may be required when tracking images according to the present invention where one of the selected objects is occluded by another object. For example, where circle 110 and rectangle 120 of frame 104 are being tracked according to the present invention, the processor system may make a determination as to the existence and placement of rectangle 120 through reference to the non-occluded portions of the rectangle and interpolation of the area there between. Additionally, or alternatively, the present invention may track an object in a frame of a series of frames through reference to other frames in the sequence. For example, the existence and placement of rectangle 120 in frame 104 might be interpolated from the existence and placement of rectangle 120 in frames 103 and 105.

From the information gathered through tracking each of the selected objects through each frame of the scene, the images of each frame may be dissected into "cells." The cells of the present invention are frame image representations having all information except that associated with a particular identified object removed therefrom. Preferably, the cells of the present invention are digitized image information sets stored within RAM 702 for utilization in manipulating source video image information. Of course, the cells may be displayed or output as images, such as through the operator interface of PC 700, if desired.

Figure 2:
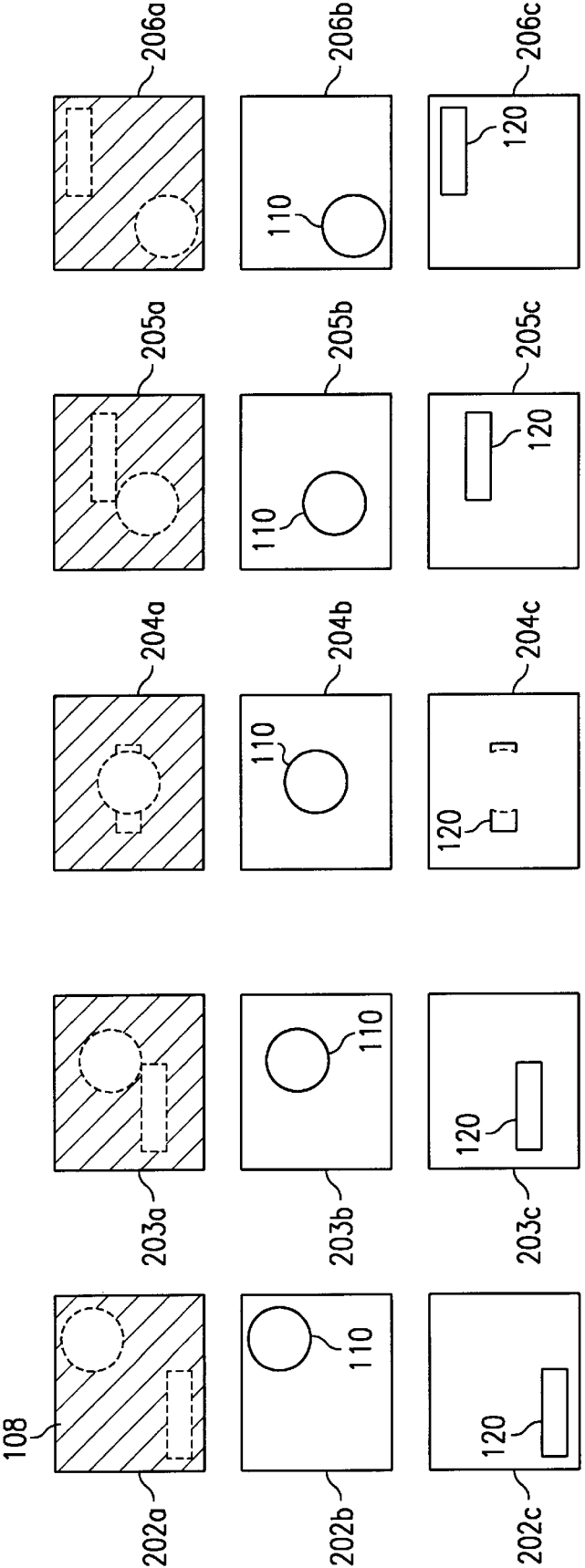
FIG. 2 illustrates the frames of FIG. 1 dissected into cells each having a single object associated therewith.

Directing attention to FIG. 2, cell images associated with frames 102–106 of the scene illustrated in FIG. 1 are shown. In each cell of a frame, here cell 202a, 202b, and 202c being associated with frame 102, includes the objects as tracked throughout the scene. It shall be appreciated that cells 202a–206a, although referred to herein as including "objects," do not actually include tracked objects, but rather include the remainder of an image when objects of interest have been removed. However, the use of the term objects herein shall include such a background image.

The cells of FIG. 2 include gaps in the images. For example, cells 202a–206a, each include gaps where the removed objects occluded the background. Likewise, cell 204c includes a gap in rectangle 120 where a portion of it was occluded by circle 110 in the frame image. It shall be appreciated that these gaps are caused by the absence of information due to the two-dimensional representation of the image.

Although not originally available in each individual image of a scene, the present invention operates to extract information with respect to each object for each cell. The above described knowledge based systems or image interpolation techniques may be utilized to fill in information missing due to occlusion by an object. Preferably, in order to provide information with respect to the missing portions of the cell image, the present invention may reference other frames in the sequence where the information of interest is not occluded. For example, the information missing from the image of cell 203a might be interpolated from that of cell 202a and/or 204a. Of course there is no limitation that the missing information be interpolated from contiguous cells in the scene. Information from any cell relevant to the missing information may be used according to the present invention.

When an image sequence is segmented over time, portions of the desired segment may not be defined when they are occluded by other segments. For example, rectangle Segment 120 in FIG. 1 is not defined when Circle 110 has occluded it as shown in FIG. 1, Segment 104 and FIG. 2, Segment 204c. Fundamental to this invention is the ability to fill in this missing data in a realistic manner.

For the sake of presentation, we will start with some simple cases and build up to the general case, as outlined in FIG. 8.

Background 108 in FIG. 1 represents the easiest case. As the circle 110 and rectangle 120 move across background 108, different areas of the background are exposed to view. As the background does not move, the values for undefined pixels in the first frame can be found by looking in the same pixel locations in subsequent frames. This is a direct temporal lookup. Note that this lookup can be forward or backward in time.

Rectangle 120 in FIG. 1 presents a harder case. As the rectangle is moving, we can not look for a value for the rectangle in the same location at other times—the rectangle was not there. For the rectangle, we must determine its motion and then compensate for this motion in the temporal lookup. For each pair of subsequent frames, we analyze the motion of the data. This can be done by regions (such as MPEG motion estimation), or by pixel, or by many other methods. This motion should be analyzed on the segmented image; otherwise the movement of other objects may interfere. For example, if we attempted to analyze the motion of the rectangle with the circle still in the frame, we may be thrown off. However, we cannot directly analyze the motion of the rectangle when it is not defined. Thus, we interpolate the motion of defined areas in order to fully define the motion of the rectangle. This corresponds to steps 801 and 803 of FIG. 8. Optionally, the resultant motion vectors may be temporally smoothed in order to define a uniform motion as shown in step 802.

Once the motion of the rectangle has been determined, we can temporally look up the missing values by searching forward and backward in time along the motion vectors (step 804). Once the related pixels are found, they can be filtered to generate a value for the undefined pixel, (step 805). This process is iterated until all undefined pixels are filled. Thereafter, some spatial edge cleanup may be employed as shown in step 806.

In this example, motion is a transformation between frames or portions of frames.

In the most general case, transformations can be determined which go beyond motion: rotation, translation, scaling, and deformation can all be analyzed. In these cases, the lookup of temporally related information becomes more complicated. For example, if scaling transformations are found, the current pixel may be related to either a portion of a pixel in other frames, or a group of pixels in other frames. In either case, all of the temporally related pixels can be used to determine the current value. Consider an object coming towards the screen. This object would have a scaling transformation—it gets bigger with time. An undefined pixel at time may be temporally related to 8 pixels at time t+5. The 8 pixels could then be filtered spatially (i.e., averaged), and combined with other temporally related data from other frames in order to create a value at time t.

Of course, there will be times when no temporal information is available—such as when an object is stationary. In these cases, information in key frames is generated using other methods (i.e., manually or using spatial mapping and filtering). Once a key frame is done, this information will be available to other frames temporally.

Alternatively, the present invention may operate to interpolate the missing information through reference to the information of the particular frame, rather than those of a scene or the information may be hand painted or obtained from a source other than the direct input. Once a portion of the data is entered, the system can use that data to complete the 3D model. Here, for example, the processor based system may utilize a knowledge based system in order to reference available data and generate compatible fill data therefrom. Where the missing information is a part of a homogenous image, such as the background of cells 202a–206a, the generation of fill data is obligatory. However, where the image is other than homogenous, the generation of fill data may require extrapolation of information based upon the image information surrounding the missing portion.

Figure 3:
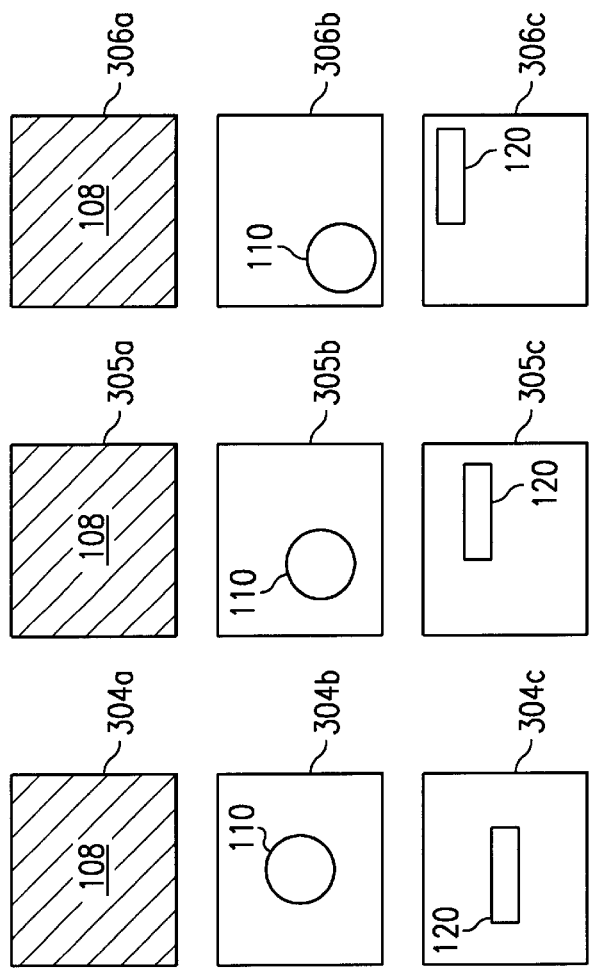
FIG. 3 illustrates the cells of FIG. 2 having missing object information filled in according to the present invention.

Once the fill data is generated, the objects of the cells may be completed such that each cell includes complete information as to the image of each object within the bounds of the frame image. Directing attention to FIG. 3, the cells of FIG. 2, having the generated fill data included therein, are illustrated. Here cells 302a–306a, 302b–306b, and 302c–306c correspond to cells 202a–206a, 202b–206b, and 202c–206c respectively, which cells in turn correspond to frames 102–106 of FIG. 1.

It shall be appreciated that by utilizing the information available from the cells of the present invention that the image objects may be manipulated, such as through the use of video generation algorithm 720, to result in a generated video image very different than the source image. For example, the objects may be moved with respect to each other and/or the background without a causing a hole or gap to appear in the generated image. Likewise, objects may be completely removed while still generating a complete image according to the present invention. Moreover, the information extracted by the present invention may be utilized to create original frames, such as ones to be placed temporally between those of the scene of FIG. 1. Here the resulting images may be used to present a scene displaying smoother movement of the objects, for example.

Additionally, the present invention provides sufficient information from which three-dimensional aspects of the image may be determined and displayed. For example, through the information acquired in tracking the objects of the image described above, it is readily discernable that rectangle 120 is disposed within in a plane more distant from the vantage point than circle 110 when the two objects pass in the scene. This is obvious because circle 110 must be disposed closer to the viewer in order to occlude rectangle 120 as the objects pass.

Moreover, having full information with respect to each object throughout each cell, and therefore each frame, the present invention may operate to determine three-dimensional plane aspects for each object. For example, relative size information of each object from frame to frame may be utilized to determine movement of the object into or out of the foreground throughout the scene. This information taken in conjunction with the relative plane information of the objects with respect to each other may be utilized to extrapolate the objects' relative plane even where one object is not occluding the other.

The present invention may utilize the above information in any number of ways. By providing depth information in conjunction with the above determined relative plane information, the image may be given three-dimensional image enhancements. For example, through the use of video generation techniques, such as rendering, shading of the image to represent shadows cast by the objects may be utilized to create a three-dimensional effect.

Figure 4:
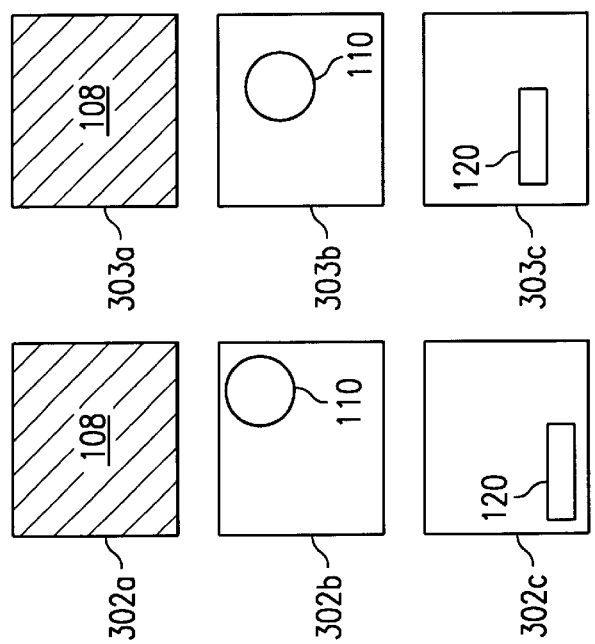
FIG. 4 illustrates a robust image resulting from a preferred embodiment of the present invention.

The results of such shading being added to the image of frame 104 is shown in FIG. 4. It shall be appreciated from a review of the image of FIG. 4, however, that the provision of depth information alone, although resulting in a three-dimensional optical effect considerably more robust than that of the two-dimensional source image, does not present as robust of an image as one might actually view. This is so because the objects appearing within the image are flat images which are displaced from one another according to the depth information described above.

Therefore, according to a preferred embodiment of the present invention, in addition to depth information, the objects themselves are given depth. This is accomplished through video generation techniques such as three-dimensional computer modeling. Here, for example, the processor system may generate a three-dimensional wire frame representing the full shape of the object. Thereafter, the image information as depicted in the cells of the present invention may be wrapped around this wire frame in order to give the object a depth aspect.

Of course, methods other than the above mentioned three-dimensional modeling may be utilized according to the present invention in order to give objects a depth aspect. For example, shading and highlighting of the object may be accomplished according to a video generation technique in order to simulate depth of a particular object.

Having given individual objects of the cells a depth aspect, the present invention may utilize the cell information to provide a robust generated image. Directing attention to FIG. 5A, an overhead view of circle 110 and rectangle 120 of frame 104 having depth aspects is shown. From this view, it can be seen that circle 110 is tilted such that the top of the circle is closer to the background than is the bottom. Likewise, it can be seen that the rectangle remains vertical, but has been wrapped around a wire frame model (i.e., the left side of an ovular cylinder). Of course, the aspects of the objects illustrated in FIG. 5A are arbitrary and may, in fact, include the use of any image manipulation technique.

Figure 5A:
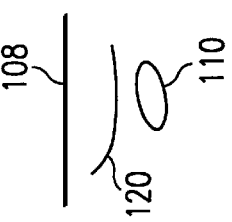
FIG. 5A illustrates an overhead view of physical placement and depth aspects of the objects represented in a frame of FIG. 1.
Figure 5B:
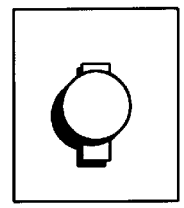
FIG. 5B illustrates a robust image representing the object placement and depth aspects of FIG. 5A resulting from a preferred embodiment of the present invention.

Directing attention to FIG. 5B, an image generated utilizing the robust information of the cells as illustrated in FIG. 5A is shown. As in the image of FIG. 4, shading has been added to the generated image in order to produce a three-dimensional optical effect. However, it shall be appreciated that unlike the image of FIG. 4, that of FIG. 5 includes shading illustrative of the depth aspects of the more robust objects. This shading manifests itself as the distortion of the regular shadows of circle 110 and rectangle 120 as well as the addition of a shadow on the face of rectangle 110 caused by its bending away from the light source.

In addition to the ability to present a more robust two-dimensional image as described above, the present invention may also be utilized in the generation of stereoscopic images. Using the information available from the cells of the present invention, the objects may be manipulated to result in related sets of generated video images which, when viewed simultaneously, give the effect of solidity or depth. For example, the present invention may utilize the cell information in combination with the video generation technique of overlaying to produce two new video images wherein the objects of each image are overlaid with slight variations. Utilizing depth information as described above, the present invention may determine a proper amount to adjust the placement of each object within each generated image in order to create the sensation of depth when the slightly different images are presented to each of a viewer's two eyes. This three-dimensional perception is obtained due to small differences in parallax due to the placement of the objects within the image.

Directing attention to FIG. 6A, an overhead view of how the objects, circle 110 and rectangle 120, having the above mentioned robust depth information added might physically be placed is shown. Also illustrated are projected sight lines associated with the left and right eyes of a viewer of the objects. It can be seen from this illustration that there is a slight displacement associated with the viewer's left and right eyes. This displacement causes a difference in parallax as the viewpoint associated with each eye is slightly different.

Having full object information with respect to each cell, the present invention may generate an image associated with the viewpoint of each eye illustrated in FIG. 6A. Thus, two images, providing slightly differing overlap of circle 110 and rectangle 120, may be generated according to the present invention, such as illustrated in FIG. 6B. When one image each is presented to a viewer's left and right eye, stereoscopic vision is achieved as the viewpoint of each eye, including the difference in parallax, is accurately and independently reproduced for the associated eye.

It shall be appreciated that the stereoscopic three-dimensional vision accomplished according to the present invention is derived from a single two-dimensional source image according to the present invention. Of course, although not shown in FIG. 6B, additional robust information, such as the aforementioned shading, may be included in the stereoscopic images in order to further enhance the illusion of three-dimensional representation.

Although a preferred embodiment of the present invention has been discussed with reference to a series, or scene, of source images, it shall be appreciated that an alternative embodiment may utilize interpolative techniques and/or knowledge based systems, as discussed above, in order to extract missing information with respect to a single frame. Accordingly, the present invention may be utilized to provide an enhanced image without reference to a series of source images.

Likewise, although the use of a single source image, or series of source images, has been discussed herein, it shall be appreciated that the present invention may be utilized with a plurality of source images. For example, a source image captured via video camera may be mixed with that of an image generated by a processor based system in order to generate a stereoscopic set of images according to the present invention.

Moreover, it shall be appreciated that, although a preferred embodiment has been discussed wherein information with respect to objects is extracted to produce a cell having complete object information associated with each object, partial object information may be utilized. For example, as the information required to provide stereoscopic images having the proper parallax typically requires only small amounts of additional information with respect to occluded object portions, stereoscopic images may be produced according to the present invention without the cells used therefor having complete object information.

Although the present invention and its advantages have been described in detail, it should be understood that various changes, substitutions and alterations can be made herein without departing from the spirit and scope of the invention as defined by the appended claims.

What is claimed is:

1. A system for digitally processing a sequence of source images, said system comprising:

means for differentiating between objects represented in said source images to produce differentiated objects;

means for parsing said source image sequences according to said differentiated objects into image cells, wherein each said image cell substantially consists of information associated with a differentiated object;

means for identifying selected differentiated objects that are associated with scaling transformations in a temporal domain;

means for determining relative planes of said selected differentiated objects;

means for producing stereoscopically enhanced image cells, wherein said means for producing stereoscopically enhanced image cells utilizes at least said relative planes to produce said stereoscopically enhanced image cells.

2. The system of claim 1 wherein said means for producing stereoscopically enhanced image cells creates stereoscopic pairs of image cells for at least certain differentiated objects.

3. The system of claim 2 wherein said means for producing stereoscopically enhanced image cells positions said certain differentiated objects between said pairs of image cells with a difference in parallax.

4. The system of claim 1 further comprising:
   means for providing depth enhancement to said differentiated objects.

5. The system of claim 4 wherein said means for providing depth enhancement creates a wire frame for certain ones of said differentiated objects.

6. The system of claim 4 wherein said means for providing depth enhancement creates shading information.

7. The system of claim 6 wherein said means for providing depth enhancement creates a shadow of one of said differentiated objects on a second one of said differentiated objects.

8. A method for digitally processing a sequence of source images, said method comprising:
   differentiating between objects represented in said source images to produce differentiated objects;
   parsing said source image sequences according to said differentiated objects into image cells, wherein each said image cell substantially consists of information associated with a differentiated object;
   identifying selected differentiated objects that are associated with scaling transformations in a temporal domain;
   determining relative planes of said selected differentiated objects; and
   producing stereoscopically enhanced image cells from said image cells utilizing at least said relative planes.

9. The method of claim 8 wherein said step of producing stereoscopically enhanced image cells creates stereoscopic pairs of image cells for certain differentiated objects.

10. The method of claim 9 wherein said step of producing stereoscopically enhanced image cells positions said certain differentiated objects between said pairs of image cells with a difference in parallax.

11. The method of claim 8 further comprising:
    providing depth enhancement to said differentiated objects.

12. The method of claim 11 wherein said step of providing depth enhancement creates a wire frame for certain ones of said differentiated objects.

13. The method of claim 11 wherein said step of providing depth enhancement creates shading information.

14. The method of claim 13 wherein said step of providing depth enhancement creates a shadow of one of said differentiated objects on a second one of said differentiated objects.

15. A computer readable medium containing processor executable instructions for digitally processing a sequence of source images, said computer readable medium comprising:
    code for differentiating between objects represented in said source images to produce differentiated objects;
    code for parsing said source image sequences according to said differentiated objects into image cells, wherein each said image cell substantially consists of information associated with a differentiated object;
    code for identifying selected differentiated objects that are associated with scaling transformations in a temporal domain;
    code for determining relative planes of said selected differentiated objects; and
    code for producing stereoscopically enhanced image cells, wherein said code for producing stereoscopically enhanced image cells utilizes at least said relative planes to produce said stereoscopically enhanced image cells.

16. The computer readable medium of claim 15 wherein said code for producing stereoscopically enhanced image cells creates stereoscopic pairs of image cells for certain differentiated objects.

17. The computer readable medium of claim 16 wherein said code for producing stereoscopically enhanced image cells positions said certain differentiated objects between said pairs of image cells with a difference in parallax.

18. The computer readable medium of claim 15 further comprising:
    code for providing depth enhancement to said differentiated objects.

19. The computer readable medium of claim 18 wherein said code for providing depth enhancement creates a wire frame for certain ones of said differentiated objects.

20. The computer readable medium of claim 18 wherein said code for providing depth enhancement creates shading information.

* * * * *